(12) United States Patent
Venkitaraman et al.

(10) Patent No.: US 10,277,933 B2
(45) Date of Patent: Apr. 30, 2019

(54) METHOD AND DEVICE FOR AUGMENTING USER-INPUT INFORMATION RELATED TO MEDIA CONTENT

(75) Inventors: Narayanan Venkitaraman, Palatine, IL (US); Santosh S. Basapur, Hanover Park, IL (US); Shirley A. Chaysinh, Grayslake, IL (US); Young S. Lee, Palatine, IL (US); Hiren M. Mandalia, Elk Grove Village, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 304 days.

(21) Appl. No.: 13/457,534

(22) Filed: Apr. 27, 2012

(65) Prior Publication Data

US 2013/0290859 A1    Oct. 31, 2013

(51) Int. Cl.
| | |
|---|---|
| H04N 21/254 | (2011.01) |
| H04N 21/431 | (2011.01) |
| G06F 17/30 | (2006.01) |
| H04N 21/478 | (2011.01) |
| H04N 21/488 | (2011.01) |
| H04N 21/854 | (2011.01) |
| H04N 21/4722 | (2011.01) |

(52) U.S. Cl.
CPC ....... *H04N 21/254* (2013.01); *H04N 21/4316* (2013.01); *H04N 21/478* (2013.01); *H04N 21/4722* (2013.01); *H04N 21/4882* (2013.01); *H04N 21/854* (2013.01); *G06F 17/3082* (2013.01); *G06F 17/30817* (2013.01)

(58) Field of Classification Search
CPC ............ H04N 21/4316; G06F 17/3082; G06F 17/30817

USPC ......................................................... 715/744
See application file for complete search history.

(56) References Cited

U.S. PATENT DOCUMENTS

| | | |
|---|---|---|
| 5,874,965 A | 2/1999 | Takai et al. |
| 6,404,978 B1 | 6/2002 | Abe |
| 6,486,896 B1 | 11/2002 | Ubillos |
| 6,711,293 B1 | 3/2004 | Lowe |
| 7,050,603 B2 | 5/2006 | Rhoads et al. |
| 7,058,891 B2 | 6/2006 | O'Neal et al. |
| 7,477,268 B2 | 1/2009 | Venolia |
| 7,836,044 B2 | 11/2010 | Kamvar et al. |
| 7,934,233 B2 | 4/2011 | Zimmerman et al. |

(Continued)

OTHER PUBLICATIONS

Barnes C. et al.: "Video Tapestries with Continuous Temporal Zoom", In ACM Transactions on Graphics (Proc. SIGGRAPH). 29(3), Aug. 2010, all pages.

(Continued)

*Primary Examiner* — Nicholas Klicos
(74) *Attorney, Agent, or Firm* — Stewart M. Wiener

(57) ABSTRACT

Disclosed is a method of augmenting user-input information that includes associating a first secondary device with primary media content, receiving user-input information input at the first secondary device, and analyzing the user-input information to identify user-content metadata. The method further includes at least one of: receiving primary-content metadata related to the primary media content and deriving primary-content metadata from the primary media content and identifying associations between the user-content metadata and the primary-content metadata.

22 Claims, 5 Drawing Sheets

(56) References Cited

U.S. PATENT DOCUMENTS

| | | | |
|---|---|---|---|
| 7,944,445 B1 | 5/2011 | Schorr et al. | |
| 7,956,847 B2 | 6/2011 | Christie | |
| 9,384,512 B2* | 7/2016 | McClements, IV | ... G06Q 50/01 |
| 2003/0074671 A1* | 4/2003 | Murakami | G06F 17/3089 725/109 |
| 2003/0182663 A1 | 9/2003 | Gudorf et al. | |
| 2006/0150218 A1* | 7/2006 | Lazar | G06Q 30/02 725/60 |
| 2006/0282776 A1 | 12/2006 | Farmer et al. | |
| 2007/0112837 A1* | 5/2007 | Houh | G06F 17/30247 |
| 2007/0294374 A1 | 12/2007 | Tamori | |
| 2008/0046925 A1* | 2/2008 | Lee et al. | 725/37 |
| 2008/0266449 A1* | 10/2008 | Rathod | G06F 17/30796 348/468 |
| 2008/0294694 A1 | 11/2008 | Maghfourian et al. | |
| 2009/0055742 A1* | 2/2009 | Nordhagen | G06F 17/30056 715/716 |
| 2009/0164301 A1* | 6/2009 | O'Sullivan et al. | 705/10 |
| 2009/0164904 A1* | 6/2009 | Horowitz et al. | 715/723 |
| 2009/0193032 A1* | 7/2009 | Pyper | 707/10 |
| 2009/0199251 A1* | 8/2009 | Badoiu | G06F 17/30867 725/105 |
| 2009/0210779 A1* | 8/2009 | Badoiu | G06F 17/3082 715/230 |
| 2009/0238460 A1 | 9/2009 | Funayama et al. | |
| 2009/0265737 A1 | 10/2009 | Issa et al. | |
| 2009/0300475 A1* | 12/2009 | Fink | G06F 17/3082 715/230 |
| 2010/0057694 A1* | 3/2010 | Kunjithapatham | G06F 17/30781 707/E17.009 |
| 2010/0162303 A1* | 6/2010 | Cassanova | H04N 5/44591 725/37 |
| 2010/0185984 A1 | 7/2010 | Wright et al. | |
| 2010/0218228 A1* | 8/2010 | Walter | G06F 17/30259 725/105 |
| 2010/0241968 A1* | 9/2010 | Tarara | G06F 3/0481 715/751 |
| 2010/0281108 A1* | 11/2010 | Cohen | G06F 17/30056 709/203 |
| 2010/0318520 A1* | 12/2010 | Loeb et al. | 707/743 |
| 2011/0021251 A1 | 1/2011 | Linden | |
| 2011/0022589 A1* | 1/2011 | Bauer | G06F 17/30855 707/723 |
| 2011/0041080 A1 | 2/2011 | Fleischman et al. | |
| 2011/0099490 A1 | 4/2011 | Barraclough et al. | |
| 2011/0113444 A1* | 5/2011 | Popovich | G06F 17/3079 725/32 |
| 2011/0126105 A1 | 5/2011 | Isozu | |
| 2011/0158605 A1 | 6/2011 | Bliss et al. | |
| 2011/0162002 A1* | 6/2011 | Jones | G06Q 30/02 725/32 |
| 2011/0214090 A1 | 9/2011 | Yee et al. | |
| 2011/0238495 A1* | 9/2011 | Kang | G06Q 30/02 705/14.49 |
| 2012/0151347 A1 | 6/2012 | McClements, IV | |
| 2012/0167145 A1* | 6/2012 | Incorvia | H04N 21/4725 725/60 |
| 2012/0210220 A1* | 8/2012 | Pendergast et al. | 715/716 |
| 2012/0227073 A1* | 9/2012 | Hosein | H04N 21/4126 725/60 |
| 2013/0014155 A1* | 1/2013 | Clarke | G06F 17/30026 725/32 |
| 2013/0019263 A1* | 1/2013 | Ferren | G06F 13/00 725/37 |
| 2013/0097285 A1* | 4/2013 | van Zwol | G06Q 30/02 709/219 |
| 2013/0159858 A1* | 6/2013 | Joffray et al. | 715/719 |
| 2013/0174195 A1* | 7/2013 | Witenstein-Weaver | H04N 21/4722 725/32 |
| 2013/0254816 A1* | 9/2013 | Kennedy et al. | 725/109 |
| 2015/0382047 A1* | 12/2015 | Van Os | G10L 15/22 725/38 |

OTHER PUBLICATIONS

Pongnumkul S. et al.: "Content-Aware Dynamic Timeline for Video Browsing", ACM Symposium on User Interface Software and Technology (UIST), Feb. 1, 2010, all pages.

PCT Search Report & Written Opinion, RE: Application #PCT/US2013/035702, dated Jun. 20, 2013.

PCT Search Report & Written Opinion, RE: Application #PCT/US2013/035714, dated Jun. 20, 2013.

Official Action RE: Korean Application No. 10-2014-7033262, dated Jun. 11, 2015.

Examination Report, Re: European Application No. 13718436.2, dated Mar. 3, 2016.

Official Action, RE: Chinese Application No. 201380022215.7, dated Mar. 17, 2016.

Official Action, RE: Korean Application No. 10-2014-7033262, dated Mar. 22, 2016.

Official Action, Re: Korean Application No. 10-2014-7033262, dated Jan. 20, 2016.

Official Action, RE: Korean Application No. 10-2014-7033262, dated Feb. 14, 2018.

Official Action, RE: Korean Application No. 10-2014-7033262, dated Jul. 13, 2018.

* cited by examiner

METHOD AND DEVICE FOR AUGMENTING USER-INPUT INFORMATION RELATED TO MEDIA CONTENT

CROSS-REFERENCE TO RELATED APPLICATIONS

The present application is related to U.S. patent application Ser. Nos. 13/457,520, 13/457,524, and 13/457,526, filed on an even date herewith.

FIELD OF THE INVENTION

The present invention is related generally to interaction with media content and, more particularly, to augmenting user-input information associated with a media source.

BACKGROUND OF THE INVENTION

Various devices exist that provide a source of viewable media content, such as televisions, computers, and mobile devices. Viewers of such media sources can, in some instances, be inclined to provide some type of commentary related to what is being viewed. Services such as Twitter™ offer a viewer the opportunity to provide a comment that is then viewable by others who follow the viewer or who visit the webpage hosting the comment. Often times the comment is general and easily attributed to the media content as a whole, although in other cases, the comment is specific to a single portion of the content. This can be confusing, since when directed to a specific portion, for example, the comment can lack relevance to a user outside the context of that specific portion of the content. In addition, a user can often desire to obtain additional information about a specific portion of content, people, or objects viewed in the content, and this can be challenging.

BRIEF SUMMARY

The above considerations, and others, are addressed by the present invention, which can be understood by referring to the specification, drawings, and claims. According to aspects of the present invention, a method of augmenting user-input information includes associating a first secondary device with primary media content, receiving user-input information input at the first secondary device, and analyzing the user-input information to identify user-content metadata. The method further includes at least one of receiving primary-media-content metadata related to the primary media content and deriving primary-content metadata from the primary media content, and identifying associations between the user-content metadata and the primary-content metadata.

In another aspect of the present invention a method of operating a secondary device in a manner that complements operation of a primary media device includes establishing an association of a first secondary device with respect to a primary media device, receiving user-input information at the first secondary device, wherein the user-input information relates to primary media content output by the primary media device, analyzing the user-input information, analyzing the primary media content, and identifying associations between the user-input information and the primary media content.

In still another aspect of the present invention, a system for receiving supplemental information related to primary media content includes a mobile device, a user interface configured to receive and to display user-input information on the mobile device, and a transmitter inside the mobile device configured to transmit at least a portion of the user-input information to another device that contains primary media content related to a discrete scene that was viewable by the user of the mobile device at the time the user-input information was, at least in part, input into the mobile device. The system further includes a receiver inside the mobile device configured to receive a communication from the other device, wherein the communication includes an augmentation to the user-input information that includes one or more of an object list, object-identification information, and primary-content metadata derived from primary media content that are associated with the discrete scene and user-content metadata derived from the user-input information.

In still yet another aspect of the present invention, a method of enhancing primary media content includes receiving a user comment on a secondary device, obtaining user-content metadata from the user comment, receiving primary-content metadata related to primary media content viewed by a user of the secondary device, determining if the user comment is related to the primary media content by analyzing the user-content metadata and primary-content metadata, and generating an augmented user comment by associating the primary-content metadata and the user comment, wherein the augmented user comment includes information that relates the user comment to a specific object or attribute of one or more scenes viewable in the primary media content.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
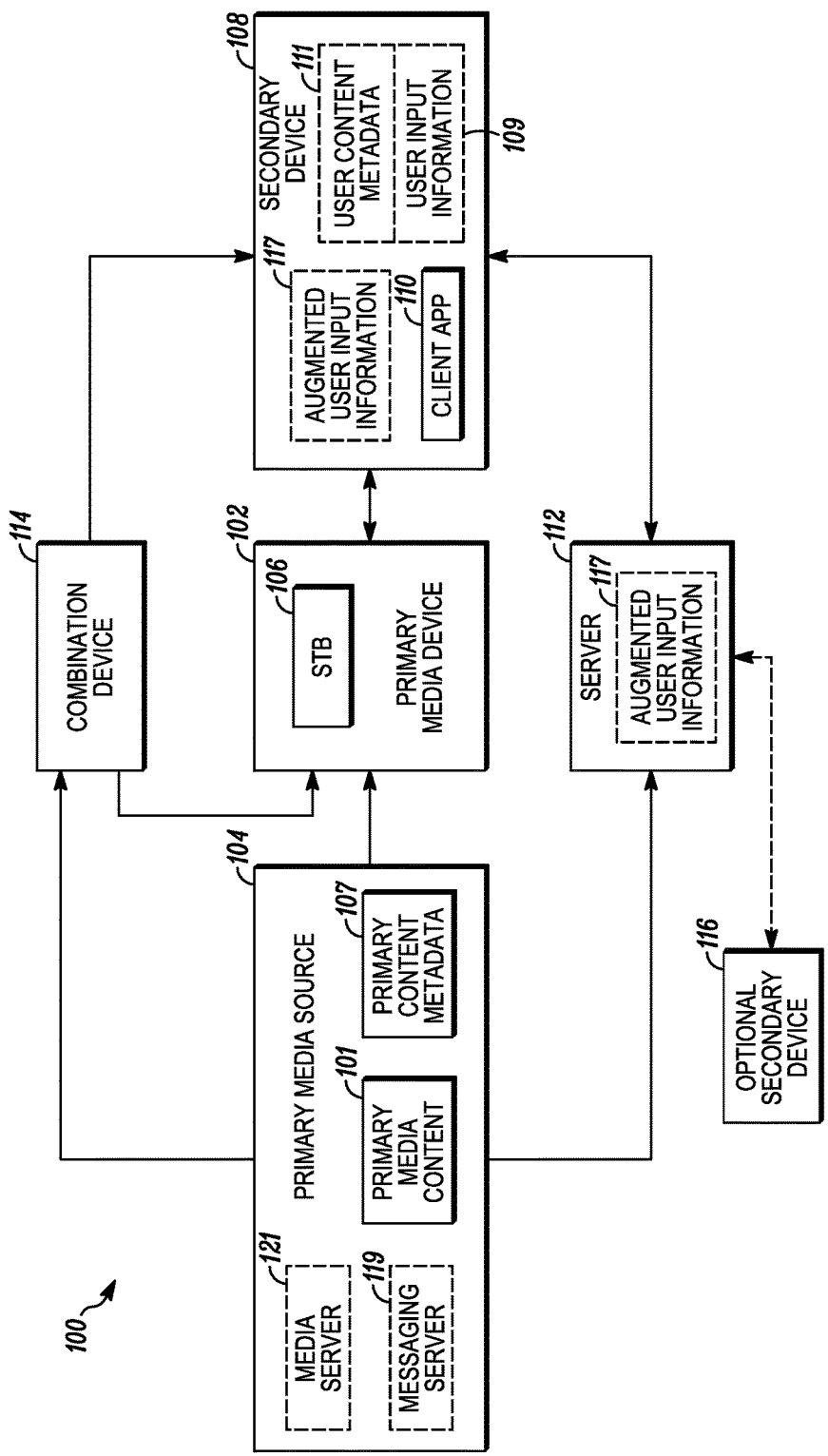
FIG. 1 is a block diagram of an exemplary communication system in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

In FIG. 1, a communication system 100 is shown having various exemplary components. More particularly, a primary media device 102 is provided for viewing primary media content 101 from a primary media source 104. The primary media device 102 includes a display (not shown) that allows a user (not shown) to view various types of primary media content 101, for example, a television program, an audio file, an e-book, a movie, and a personal video. The primary media device 102 can include one or more of various types of devices that allow the viewing of the primary media content 101, such as a television (e.g., Google TV™), a computer, and a mobile device. In at least some embodiments, the primary media device 102 includes an additional device, such as a set-top box 106 configured to receive and process the primary media content 101 for viewing on the primary media device 102. The primary media device 102 can receive the primary media content 101 via one or more of various types of communication, such as satellite transmission, cable transmission, and the Internet.

As additionally shown in FIG. 1, a secondary device 108 is configured for communication with one or more components of the communication system 100. The secondary device 108 is, in at least some embodiments, a mobile device, such as a smart phone, a tablet, or a laptop computer. In other embodiments, the secondary device 108 can include other devices, such as a non-mobile device, for example, a desktop computer. The secondary device 108 can include interface software, such as a client application 110 that is configured to interface the secondary device 108 with one or more components in the communication system 100, such as the primary media device 102 and a server 112. In addition, the client application 110 can be utilized to perform one or more of the discussed actions for the secondary device 108. The secondary device 108 can communicate with the various devices in the communication system 100 via one or more of various types of communication using for example, the wireless transceivers 202 (of FIG. 2) or a hardwired connection. In addition, one or more other secondary devices 116 can also be included in the communication system 100, as discussed below.

The communication system 100 can include the server 112 to communicate with one or more components in the communication system 100 using one or more of various wired and wireless methods of communication, for example via cellular signals or the Internet. The server 112 can include one or more hardware or software components working in concert or independently to provide information storage that is accessible via a network, such as the Internet. In at least some embodiments, the server 112 includes one or more hard drives, while in other embodiments, the server 112 can include various microchip-based memory storage devices, such as random-access memory, either in place of or in addition to a hard drive-based storage medium. Further, in at least some other embodiments, the server 112 can include a dedicated storage server service, such as a "cloud service," which can involve multiple storage devices operating in concert with one another. Further, the communication system 100 can include a combination device 114, such as a Televation Device™. The Televation Device™ collects various types of primary media content 101 received from one or more of numerous sources, for example, via satellite transmission, cable transmission, and the Internet. The combination device 114 is capable of communicating the primary media content 101 to various devices in the communication system 100, such as the primary media device 102 and the secondary device 108.

In at least some embodiments, the communication system 100 allows a user to view primary media content 101 from the primary media source 104 on the primary media device 102 and to use the secondary device 108 to compose user-input information 109, such as text-based and voice-based user comments (posts) related to the primary media content 101. The user-input information 109 is related to user-content metadata 111, as discussed in detail below. The primary media source 104 can include one or more of various media sources, such as television stations, cable and web-based providers, rental-based movie providers, etc., which broadcast or otherwise provide access to primary media content 101. In at least some embodiments, the primary media source 104 includes a messaging server 119, such as an extensible messaging and presence protocol server (XMPP), which provides messaging between devices such as the primary media device 102 and server 112. In at least some other embodiments, the primary media source 104 includes a media server 121 which broadcasts or otherwise provides access to primary media content 101. Primary media content 101 can include any of numerous types of information, such as ebooks, movies, television shows, webcasts, videos, etc. The primary media content 101 is related to the primary-content metadata 107, as discussed in more detail below.

In at least some embodiments, the secondary device 108 receives user-input information 109 with respect to which various operations can be performed. For example, the user-input information 109 can be augmented to include additional information that is supplemental to the user-input information 109, such as primary-content metadata 107 related to the primary media content 101 provided by the primary media device 102 or a scene watermark ID that associates the user-input information 109 with a specific "scene" viewed on the primary media device 102. It is noted that, in at least some embodiments, a "scene" is considered a single video frame where the action is frozen, such as in a still picture. In addition, the user-input information 109 can be augmented to include an association to a specific object, such as a person, feature (e.g., a specific clothing item or a scene location), or article, found in a video frame. Further, the user-input information 109 can be augmented to provide additional information about an object that has been identified in the scene or the user-input information 109. Once the user-input information 109 has been augmented, another user can view an augmented version of the user-input information 109 from the secondary device 108 or another device such as the additional secondary device 116 that is distinct from the secondary device 108. In one scenario the other user may view the augmented user-input information independent of the primary media. In another scenario, the other user may view the augmented user input in the presence of the primary media. In the latter scenario, portions of the augmented comment may be used to further augment the primary media being viewed by the second user. The other user can provide additional augmentation of the user-input information 109, such as by associating the user-input information 109 that has been augmented with additional user-input information provided by that other user, or by identifying or linking an object referenced in the user-input information 109 that has (or has not) been augmented.

Figure 2:
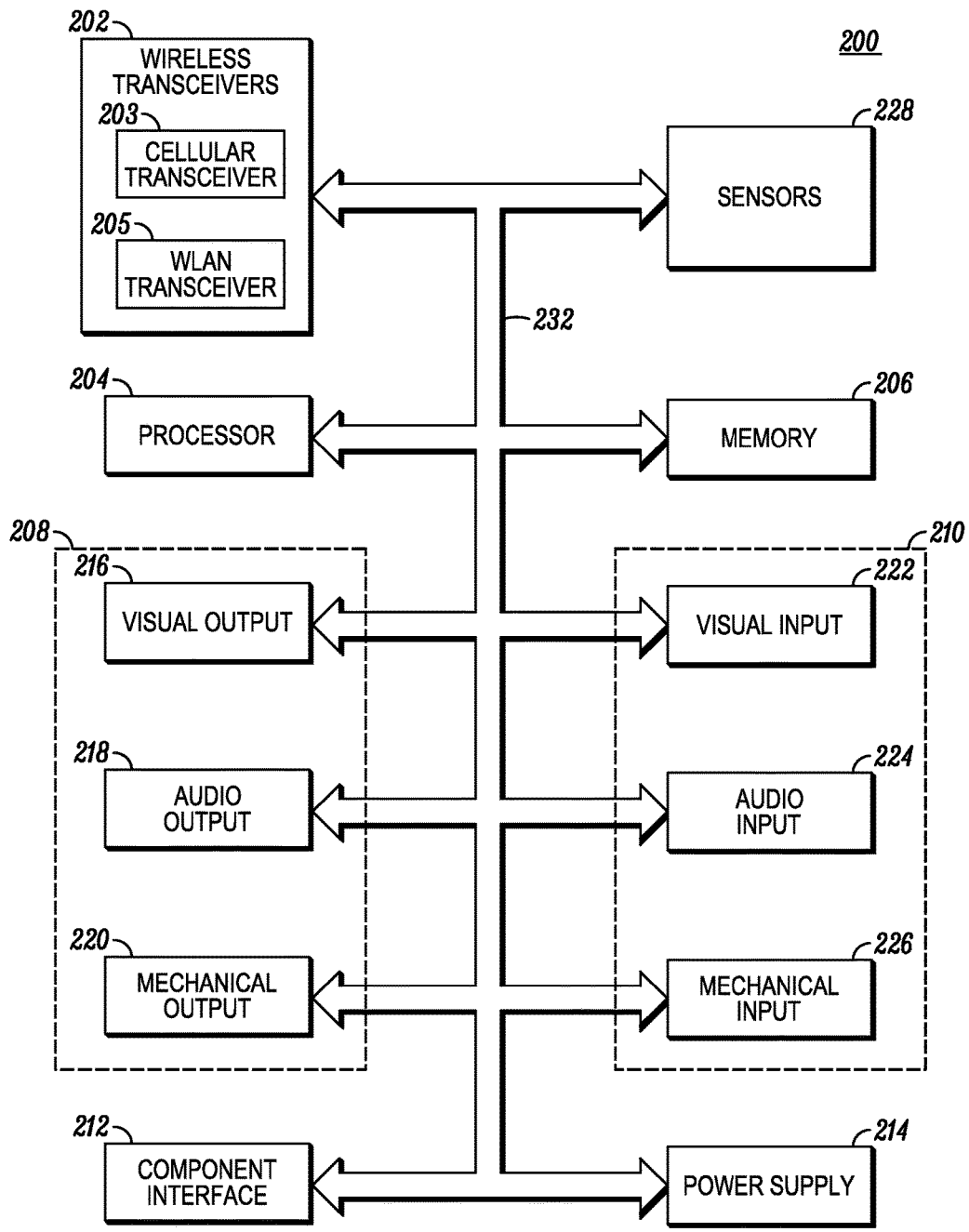
FIG. 2 is a block diagram showing exemplary internal hardware components of the exemplary secondary device of FIG. 1.

Turning to FIG. 2, there is provided a block diagram illustrating exemplary internal components 200 of the secondary device 108 shown in FIG. 1. In at least some embodiments, these internal components 200 can be present in other secondary devices that might communicate with components of the communication system 100, such as the secondary device 116. As shown in FIG. 2, the components 200 of the secondary device 108 include multiple wireless transceivers 202, a processor portion 204 (e.g., a microprocessor, microcomputer, application-specific integrated circuit, etc.), a memory portion 206, one or more output devices 208, and one or more input devices 210. In at least some embodiments, a user interface is present that comprises one or more of the output devices 208, such as a display, and one or more of the input devices 210, such as a keypad or touch sensor. The internal components 200 can further include a component interface 212 to provide a direct connection to auxiliary components or accessories for additional or enhanced functionality. The internal components 200 preferably also include a power supply 214, such as a battery, for providing power to the other internal components while enabling the secondary device 108 to be portable. Further, the internal components 200 can additionally include one or more sensors 228. All of the internal components 200 can be coupled to one another, and in communication with one another, by way of one or more internal communication links 232 (e.g., an internal bus).

Further, in the present embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, vis-à-vis cell towers (not shown), albeit in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), or next generation communications (using UMTS, WCDMA, LTE, IEEE 802.16, etc.) or variants thereof.

By contrast, the Wi-Fi transceiver 205 is a wireless local area network transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth, or other wireless communication technologies such as infrared technology. Thus, although in the present embodiment the secondary device 108 has two of the wireless transceivers 203 and 205, the present disclosure is intended to encompass numerous embodiments in which any arbitrary number of (e.g., more than two) wireless transceivers employing any arbitrary number of (e.g., two or more) communication technologies are present.

Exemplary operation of the wireless transceivers 202 in conjunction with others of the internal components 200 of the secondary device 108 can take a variety of forms and can include, for example, operation in which, upon reception of wireless signals, the internal components detect communication signals, and the transceivers 202 demodulate the communication signals to recover incoming information, such as voice or data, transmitted by the wireless signals. After receiving the incoming information from the transceivers 202, the processor portion 204 formats the incoming information for the one or more output devices 208. Likewise, for transmission of wireless signals, the processor portion 204 formats outgoing information, which can but need not be activated by the input devices 210, and conveys the outgoing information to one or more of the wireless transceivers 202 for modulation so as to provide modulated communication signals to be transmitted. The wireless transceivers 202 convey the modulated communication signals by way of wireless (as well as possibly wired) communication links to other devices, such as one or more other components of the communication system 100 of FIG. 1.

Depending upon the embodiment, the output and input devices 208, 210 of the internal components 200 can include a variety of visual, audio, or mechanical outputs. For example, the output devices 208 can include one or more visual output devices 216 such as a liquid crystal display and light-emitting diode indicator, one or more audio output devices 218 such as a speaker, alarm or buzzer, or one or more mechanical output devices 220 such as a vibrating mechanism. The visual output devices 216, among other things, can also include a video screen. Likewise, by example, the input devices 210 can include one or more visual input devices 222 such as an optical sensor (for example, a camera lens and photosensor), one or more audio-input devices 224 such as a microphone, and one or more mechanical-input devices 226 such as a flip sensor, keyboard, keypad, selection button, navigation cluster, touch pad, capacitive sensor, motion sensor, and switch. Operations that can actuate one or more of the input devices 210 can include not only the physical pressing of buttons or other actuators but can also include, for example, opening the secondary device 108 (if it can take on open and closed positions), unlocking the secondary device 108, moving the secondary device 108 to actuate a motion, moving the secondary device 108 to actuate a location-positioning system, and operating the secondary device 108.

As mentioned above, the internal components 200 also can include one or more of various types of sensors 228. The sensors 228 can include, for example, proximity sensors (e.g., a light-detecting sensor, an ultrasound transceiver, or an infrared transceiver), touch sensors, altitude sensors, and one or more location components that can include, for example, a Global Positioning System receiver, a triangulation receiver, an accelerometer, a tilt sensor, a gyroscope, or any other information-collecting device that can identify a current location or user-device interface (carry mode) of the secondary device 108. While the sensors 228 are for the purposes of FIG. 2 considered to be distinct from the input devices 210, in other embodiments it is possible that one or more of the input devices can also be considered to constitute one or more of the sensors (and vice-versa). Additionally, while in the present embodiment the input devices 210 are shown to be distinct from the output devices 208, it should be recognized that in some embodiments one or more devices serve both as input devices and output devices. For example, in embodiments where a touch screen is employed, the touch screen can be considered to constitute both a visual-output device and a mechanical-input device.

The memory portion 206 of the internal components 200 can encompass one or more memory devices of any of a variety of forms (e.g., read-only memory, random-access memory, static random-access memory, dynamic random-access memory, etc.) and can be used by the processor 204 to store and retrieve data. In some embodiments, the memory portion 206 can be integrated with the processor portion 204 in a single device (e.g., a processing device including memory or processor-in-memory), albeit such a single device will still typically have distinct sections that perform the different processing and memory functions and that can be considered separate devices. The data that are stored by the memory portion 206 can include, but need not be limited to, operating systems, applications, and informational data.

Each operating system includes executable code that controls basic functions of the secondary device 108, such as interaction among the various components included among the internal components 200, communication with external devices via the wireless transceivers 202 or the component interface 212, and storage and retrieval of applications and data to and from the memory portion 206. Each application includes executable code that utilizes an operating system to provide more specific functionality, such as file-system service and handling of protected and unprotected data stored in the memory portion 206. Such operating system or application information can include software update information (which can be understood to potentially encompass updates to either applications or operating systems or both). As for informational data, this are non-executable code or information that can be referenced or manipulated by an operating system or application for performing functions of the secondary device 108. Additionally, among other things, informational data can include any of a variety of types of information that are downloaded to (or uploaded from) the secondary device 108 from (or to) other devices such as the server 112 and secondary device 116.

Figure 3:
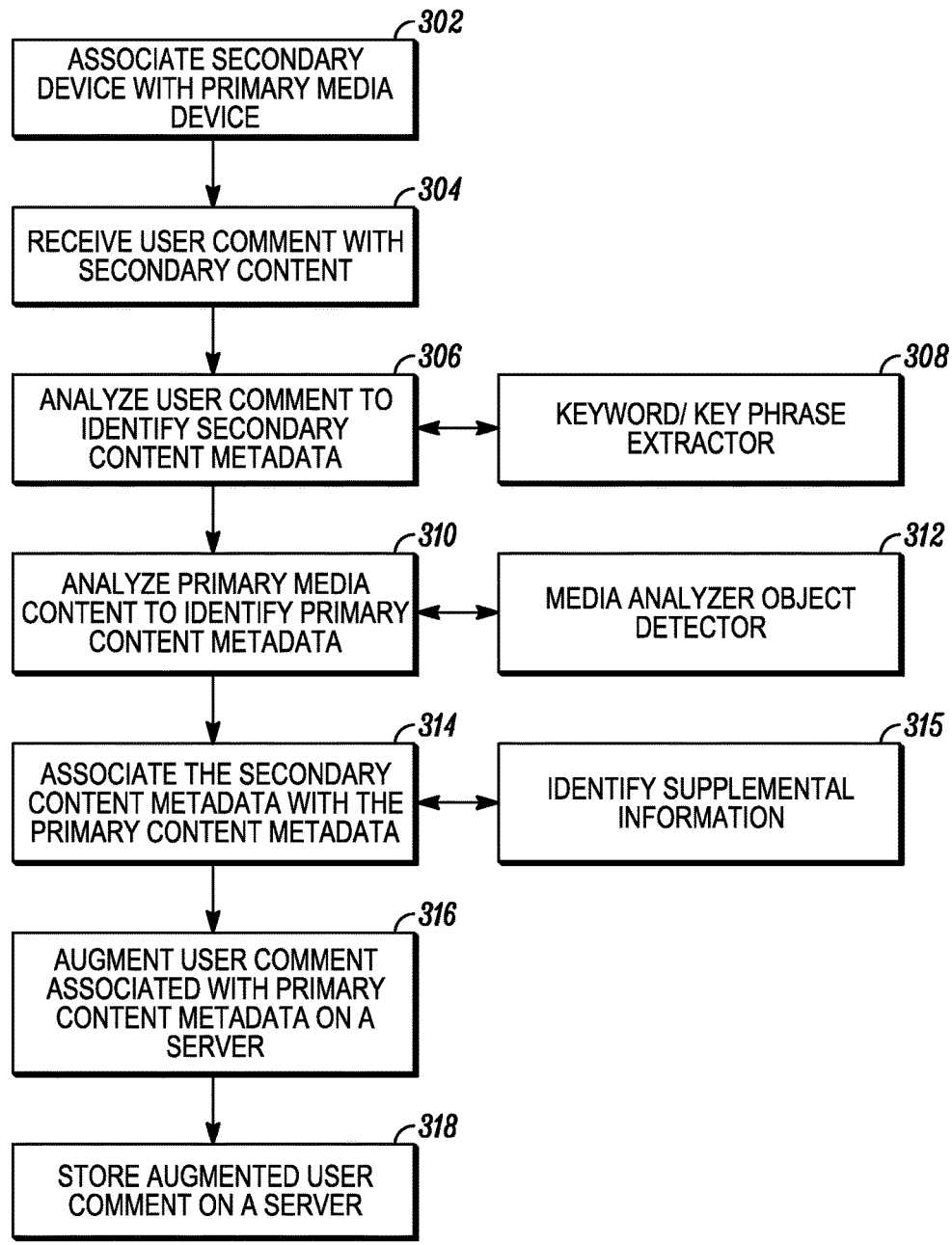
FIG. 3 is a flowchart of an exemplary method for associating user-input information with primary media using the communication system of FIG. 1.

Referring to FIG. 3, a flowchart shows steps of an exemplary method for associating user-input information 109 with the primary media content 101 and augmenting that user-input information using the communication system 100. These steps can be performed by one or more of the secondary device 108, the combination device 114, and the server 112, independently or together. As discussed above, the communication system 100 allows the user to view primary media content 101, such as with the primary media device 102, and to compose and associate user-input information 109 related to the primary media content 101 using the secondary device 108. More particularly, in step 302, the secondary device 108 is associated with the primary media device 102 using one or more of a plurality of communication methods and protocols, such as Bluetooth, Wi-Fi, the Internet, peer-to-peer, etc. In one embodiment, the secondary device 108 can be paired with multiple other primary media devices 102 using a PIN, and a user can select the desired primary media device 102 using one or more input devices of the secondary device 108. Alternately, the secondary device 108 can automatically determine the appropriate primary media device 102 based on proximity techniques such as RFID, location techniques such as room identifiers (e.g., living room, bedroom), line-of-sight techniques such as object recognition, or reading a Quick Response code. In another embodiment, the secondary device 108 and primary media device 102 can independently register with the combination device 114 or the primary media source 104 (e.g., the messaging server 119 or media server 121) providing information such as device identifier, user identifier, and location identifier. The combination device 114 or server 112 can then associate the secondary device 108 and the primary media device 102 based on this information and optionally inform them about the association.

During the displaying of the primary media content 101, the secondary device 108 receives user-generated user-input information 109 (e.g. secondary content), such as a user comment, which can be related to a particular scene found in the primary media content 101, as shown in step 304. The user comment is provided to the secondary device 108 using one or more of the input devices 210, such as a keypad (not shown), voice command, etc. The user comment is analyzed in step 306 to identify the user-content metadata 111 within (or associated with) the user comment or other user-input information 109. The analyzing can be done in one or more of the devices in the communication system 100, such as the secondary device 108, the server 112, the messaging server 119, or the media server 121. Furthermore, the analyzing can be done after the user has entered a full comment or part of a comment. The analyzing can include the performance of speech-to-text conversions, one or more of various text-analysis methods, such as the use of a keyword or key-phrase extractor to parse the user comment, as shown in a box 308. For example, when a user hears a person shown in a video displayed on the primary media device 102 make a particular statement, a user can input a user comment, for example, "I do not agree with what he says, but that is a nice oven." This user comment can be parsed to user-content metadata 111 that include the following keywords and key phrases, such as "I", "he," "do not agree," "says," "nice," and "oven."

Referring now to step 310, the entry of a user comment at the secondary device 108 or the primary media source 104 (e.g., the media server 121 or the messaging server 119) can further initialize a process for analyzing the primary media content 101 to identify primary-content metadata 107. In one embodiment, the scene of the primary media content 101 that is chosen for analysis is identified based on the name of the program, movie, the context of the user comment (for example, if this is in response to a prior user comment by the same or different user), and the time of entry of the user comment or other user-input information 109. More particularly, the secondary device 108 can communicate with another device in the communication system 100, such as the primary media device 102 or primary media source 104 to request primary-content metadata 107 associated with the user comment time.

The primary-content metadata 107 can be obtained by one or more methods, such as using a metadata-provider service, information encoded in the primary media content 101, and a media analyzer or object detector, as identified in box 312. The primary-content metadata 107 can include numerous items, such as a listing of objects included in the scene and their locations, who is acting in the scene, what is being said and by whom, the name of the movie or television show, etc. In at least some embodiments, primary-content metadata 107 can be provided as an encoded signal in the primary media content 101, such as found in closed captioning, and therefore be at least partially pre-derived from the primary media content 101. In at least some other embodiments, the primary-content metadata 107 can be derived from the primary media content 101 utilizing an operation performed by one or more of the secondary device 108, the server 112, the set top box 106, or the combination device 114. Further, in at least some embodiments, the primary media source 104 or the combination device 114 can analyze the primary media content 101 using techniques, such as object detection, as described in U.S. Pat. No. 6,711,293 and U.S. Patent Publication 2009/0238460, which are both hereby incorporated by reference herein. The primary media content 101 can then be combined with the primary-content metadata 107 using object-based encoding, wherein in at least some embodiments, the object-based encoding is similar to the encoding process used for MPEG-4. Once encoded, the primary media content 101 can be transmitted to the primary media device 102, secondary media device 108, or server 112, to perform the analysis of the primary media content 101 for derivation of the primary-content metadata 107. In yet some other embodiments, the primary-content metadata 107 are pre-derived and accessible from a third-party service in communication with the communication system 100, such as Tribune Media Service™.

Further to the aforementioned example, the user comment noted above can be input into the secondary device 108 during the viewing of primary media content 101 that includes a television program, such as a food critic show, as viewed on the primary media device 102. The primary-content metadata 107 that are generated or provided can include information such as who was speaking at the moment in time the user comment was made, what they were saying prior to or during that time, and what objects were present in the scene. For example, "Chef Pavoli is speaking," "That quiche looks horrendous," "Flame Master brand oven," "Picture of Lake Erie," etc.

Referring now to step 314, numerous associations between the user-content metadata 111 and the primary-content metadata 107 are generated by further analysis. These associations are used to automatically augment the user comment at step 316. For example, the user-content metadata 111 associated with the user comment includes the key phrase "nice oven," having the keyword "oven," which is associated with the key phrase of the primary-content metadata 107 "Flame Master brand oven," via the use of the keyword "oven." As a result of this association, the user's comment (or other user-input information 109) is augmented in step 316 to include the identity of the brand of oven that was referenced in the user comment, that is, the Flame Master. Further, as a result, the user or another individual associated with the primary media device 102 or another primary media device (not shown) can access the augmented user-input information 117 (e.g., augmented user comment) related to a scene of the primary media content 101.

Additionally, when the augmented user-input information 117 is viewed by a second user while watching the primary media content 101, the primary media content 101 being watched by the second user may be augmented using information from the augmented user-input information 117. For example, when another user watches a rebroadcast of the show or a DVR-d version of the show, then a part of the augmented user-input information 117 can be displayed via the secondary device 108 and another part can be displayed via the primary media device 102. In one embodiment, the combination device 114 receives the primary media content 101 from the primary media source 104, receives part of the augmented user-input information 117 (such as graphical X-Y axis coordinates or media object tracking ID for an object which the augmented user-input information 117 is referring to) from the secondary device 108, and then combines them using one of various media mixing or overlaying techniques to create an augmented view of the primary media content 101 that is displayed as the user is consuming the corresponding augmented user-input information 117. In another embodiment, the primary media source 104 determines that a user is watching the primary media content 101 and obtains a subset of augmented user-input information 117 that will be sent to the user, combines a part of the augmented user-input information 117 with the corresponding part in the primary media content 101, and transmits the augmented primary media content 101 to be displayed to the user while the secondary device displays another part of the augmented user-input information 117. This may be done based on one or more of various preferences of the user. For example, only augmented user-input information 117 that has been at least partially generated by a particular user, such as user included in a specific social group (friends, family, etc.), will be displayed.

The associations between the user-content metadata 111 and the primary-content metadata 107 can be utilized to provide additional information not available in the primary-content metadata 107 itself. For example, after the key phrase "Flame Master brand oven" has been associated with the user's comment, an Internet search can be automatically performed to provide supplemental information about "Flame Master brand ovens," such as models, reviews, prices, etc., that can serve to further augment the user's comment, as in step 315. Furthermore a user can also provide some modifiers that should appear on the primary media content 101 when the comment is being viewed at a later time by another user. In one embodiment, when the user enters a comment, a scene box that displays the scene that is associated with the user's comment (e.g., where the Flame Master oven is displayed) is also displayed to the user on the secondary device 108, and the user can enter a modifier, such as a circle around or an arrow pointing to an object using the client application 110 on the secondary device 108. These modifiers can also be stored along with the user comment and then used to augment the primary media content 101, as described earlier. As shown in step 318, the user comment can be stored with any associated augmentation in the server 112. The associations generated for user-input information 109 serve to augment the user-input information 109 so as to not only provide additional information to the user of the secondary device 108, but also to provide such augmented information to other individuals that interface with the user comment, with or without the associated primary media content, using other devices such as the secondary device 116.

In at least some embodiments, an accessible storage medium, such as the server 112, is provided to serve as a repository for a variety of information, such as the user-content metadata 111, primary-content metadata 107, original user-input information 109, and augmented user-input information 117, primary media content 101, etc. In addition, the server 112 can store all the information that is related to specific videos (for example), enabling a plurality of secondary devices to access the server 112 and to obtain the user-input information 109 and the augmented user-input information 117, as well as to add their own user-input information. In at least some embodiments, the server 112 can perform various functions, such as receiving and analyzing the primary media content 101 to derive the primary-content metadata 107. Further, in at least some embodiments, the server 112 can be a cloud service that is accessible by secondary devices and in communication with the primary media source 104.

In at least some embodiments, the primary media content 101 can be loaded onto the secondary device 108, along with the associated primary-content metadata 107, prior to viewing the primary media content 101, such that the secondary device 108 does not need to communicate with another component of the communication system 100 in order to augment the user-input information 109 for viewing on the secondary device 108.

Figure 4:
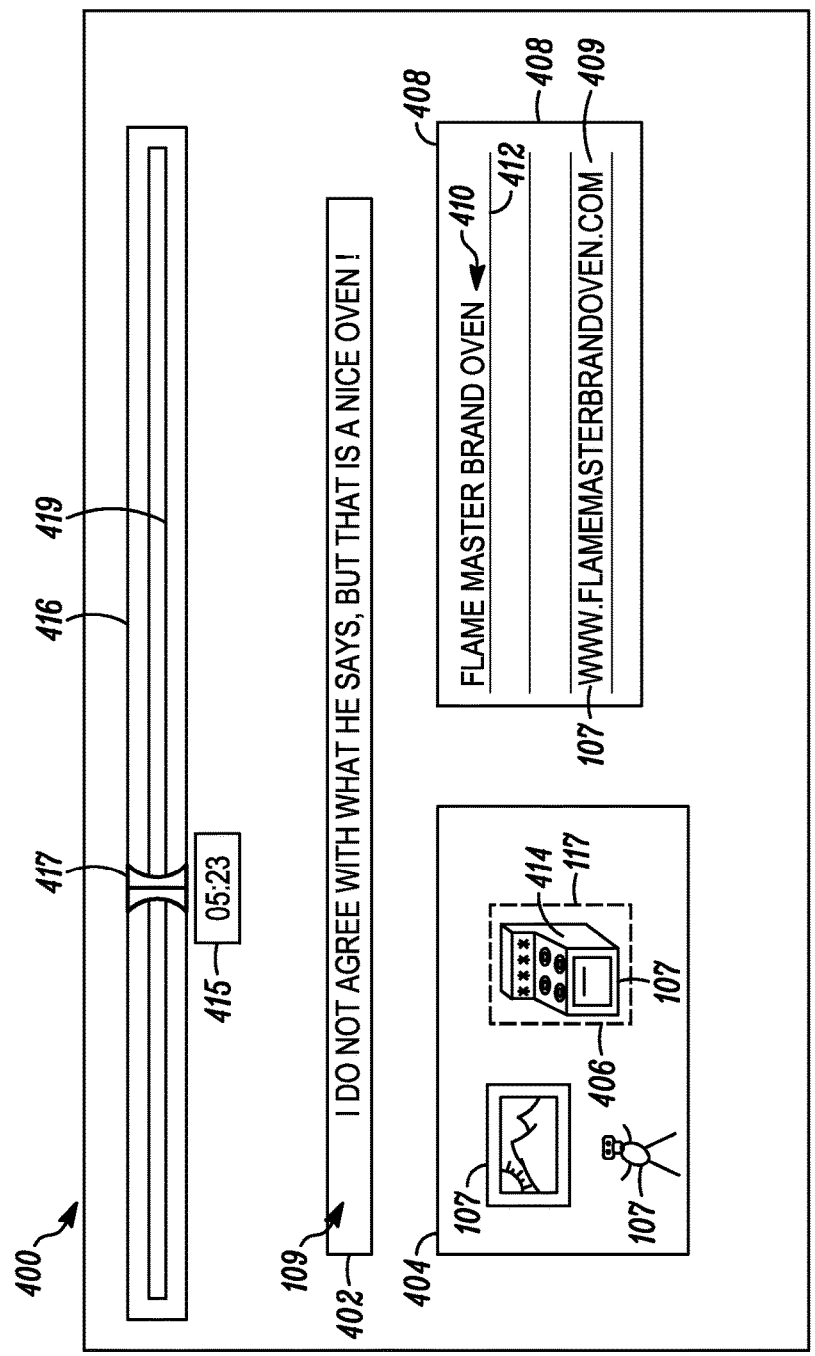
FIG. 4 is a diagram of an exemplary user interface viewable on the secondary device of FIG. 1.

Referring now to FIG. 4, a diagram of an exemplary user interface 400 that is viewable on the secondary device 108 is shown. The user interface 400 is configured to receive signals from one or more input devices 210 of the secondary device 108 and can be considered such an input (and output) device. In the present embodiment, the user interface 400 can display various features, such as a text box 402 that can be used to show a user's comment as it is input into the secondary device 108 or to show a previously entered comment, in original or augmented form. The user interface 400 can also include a scene box 404 that displays the scene that is associated with the user's comment (e.g., due to the time the comment was entered). The scene box 404 can also include various augmentations, such as object boxes 406 that are positioned around particular objects to identify them in the scene, wherein the object boxes 406 can be associated with a particular augmentation. For example, the oven mentioned in the user's comment could be identified in the scene box 404 with an object box 406. This provides a viewer of the user interface 400 a convenient method to find the object referenced in a particular user comment as well as to provide a selectable object that, when selected, reveals additional information about the oven. Using this interface 400 a user may also provide any additional transformations to the primary media content 101 that the user wishes to have when the user comment is viewed at a later time. The object boxes 406 can be provided by the secondary device 108, with the positioning of the object boxes 406 being determined by one or more of various sources, such as the secondary device 108, the server 112, the combination device 114, etc.

In addition, a listing box 408 can be included in the user interface 400. The listing box 408 can include lines 410 that each provide the identity of an object that has been associated with the scene via user-content metadata 111 or primary-content metadata 107. The listing box 408 can function in one or more of various manners. For example, a line 412 can include the text "Flame Master brand oven." This text could appear when a user selects the object box 406 surrounding the oven 414. In addition or alternatively, the text in line 412 can appear when a user's comment is analyzed to identify the keyword "oven." Further, in at least some other embodiments, when the text in line 412 is selected the object box 406 can be highlighted, to identify the object identified on line 412. In addition, line 412 can also display links to additional resources, such as a Webpage link 409 that can provide information about an object, such as specifications, prices, and reviews.

A timeline box 416 can also be included in the user interface 400. The timeline box 416 includes a timeline monitor 417 that extends along a timeline 419. The timeline monitor 417 provides an indication as to the time the scene shown in the scene box 404 occurred in the video and displays it in a time display box 415. In addition, timeline monitor 417 can be shifted to another time, such as by touching the timeline 419, to move through a video to select a particular scene from another time point in the video, thereby displaying the scene for that time in the scene box 404. When a particular scene is selected using the timeline box 416, each of the information boxes in the user interface 400 can be updated, including the text box 402, scene box 404, and listing box 408. In addition to the aforementioned information boxes, various other buttons, boxes, and options can be displayed and selected on the user interface 400. In this manner, the user interface can be configured to provide a user of the secondary device 108 (or other secondary device 116) with a plethora of options to customize his interaction with the primary media content 101.

In at least one exemplary application of the above information, the following operations can occur. A user opens the client application 110 on his secondary device 108 while watching a cooking show on the primary media device 102. The user interface 400 is displayed, which may or may not be displaying the cooking show as it is broadcast. The secondary device 108 is then paired to the primary media device 102. The secondary device 108 can obtain information about the primary media content 101 that is being viewed from one of the primary viewing device 102, the combination device 114, or the media source 104. A scene is viewed on the primary media device 102 that includes an oven. Upon viewing the oven, the user starts to type the comment "nice oven." The secondary device 108 notes the time the comment was entered and what primary media content 101 was being watched at the time the comment was made. The user's comment is analyzed by the secondary device 108, which identifies the keyword "oven." Alternatively, the user's comment can be sent to another device in the communication system 100 for analysis. In at least some embodiments, the secondary device 108 may not be aware of what the user is watching. Although, in some embodiments, the secondary device 108 can ascertain what the primary media device 102 is currently displaying by querying the primary media device 102 or another device, such as the combination device 114 or the primary media source 104 (e.g., the messaging server 119 or media server 121). The comment time and identified show, along with the keyword "oven," identified now as user-content metadata 111 are sent to the server 112, where the primary media content 101 has been (or is actively) parsed to identify primary-content metadata 107. The primary-content metadata 107 (for the time the scene occurred) is searched for the word "oven" and when the term "Flame Master brand oven" is found, an association is established and stored by the server 112. The term "Flame Master brand oven" is now tied to the user comment forming augmented user-input information 117, which includes both the user comment and the associated primary-content metadata 107. The augmenting information is sent to the secondary device 108 along with an image of the scene for display on the user interface 400. Alternatively, the scene can be provided by the secondary device 108 if the primary media content 101 was being viewed on the secondary device 108. The user interface 400 then displays the user comment in the comment box 402, the scene in the scene box 404, and the phrase "Flame Master brand oven" in the listing box 408. The oven 414 can be boxed or otherwise highlighted in the scene box 404 to identify the oven 414. Alternately, the highlighting can be provided in the primary media device 102.

In one embodiment, the server 112 communicates with the primary media source 104 or the combination device 114 to highlight the potential items related to the user comment being made by the user. This can be accomplished using techniques such as MPEG object tracking and highlighting. Further, a website address can be displayed in the listing box 408. Later, another user can open another user interface on his secondary device 116 and select this video to watch. When the scene associated with the user comment occurs, the user comment appears along with the associated augmenting data in the scene box 404 and listing box 408 that serves to augment the comment. In another embodiment, the user comment "nice oven" is displayed on the secondary device 116 and a highlight of the over occurs on the primary media content 101 displayed in the primary media device 102.

Provided below is a code listing that provides an exemplary method of storing the augmented comment, from the above example, in the server 112.

```
<AugmentedComment group=abc author=xyz>
    <comment><html>Nice oven</html></comment>
    <primarymedia assetid=1234>
        <name>cooking show</name>...
    </primarymedia>
    <time>134sec</time>
    <Duration>10sec</Duration>
```

-continued

```
<item tag=oven>
    <obectid>123</objectid>
    <location pos=x,y />
    <desc> Flame Master brand oven</desc>
    <transform>
        <arrow>
            <img pos=(x1,y1) src=arrow.jpg/>
        </arrow>
    </transform>
```

The above code addresses the example augmented comment related to the "Flame master oven" scenario previously discussed. More particularly, an XML representation of an augmented comment which provides that the comment was made by "xyz" as part of a conversation that is grouped under a group called "abc." The user comment itself is "Nice oven," which was made in the context of primary media content 101 whose id is "1234" and name is "cooking show." The user comment was made at the time 134 seconds into the show and is relevant for 10 seconds from that time. It is related to an oven which has a media object ID "123" and is positioned at coordinates x,y in the primary media content 101. Also, when the user comment is displayed to a user, if the primary media content 101 is also being watched, then an arrow should be placed at coordinates x1,y1 on the screen to identify the oven object.

Figure 5:
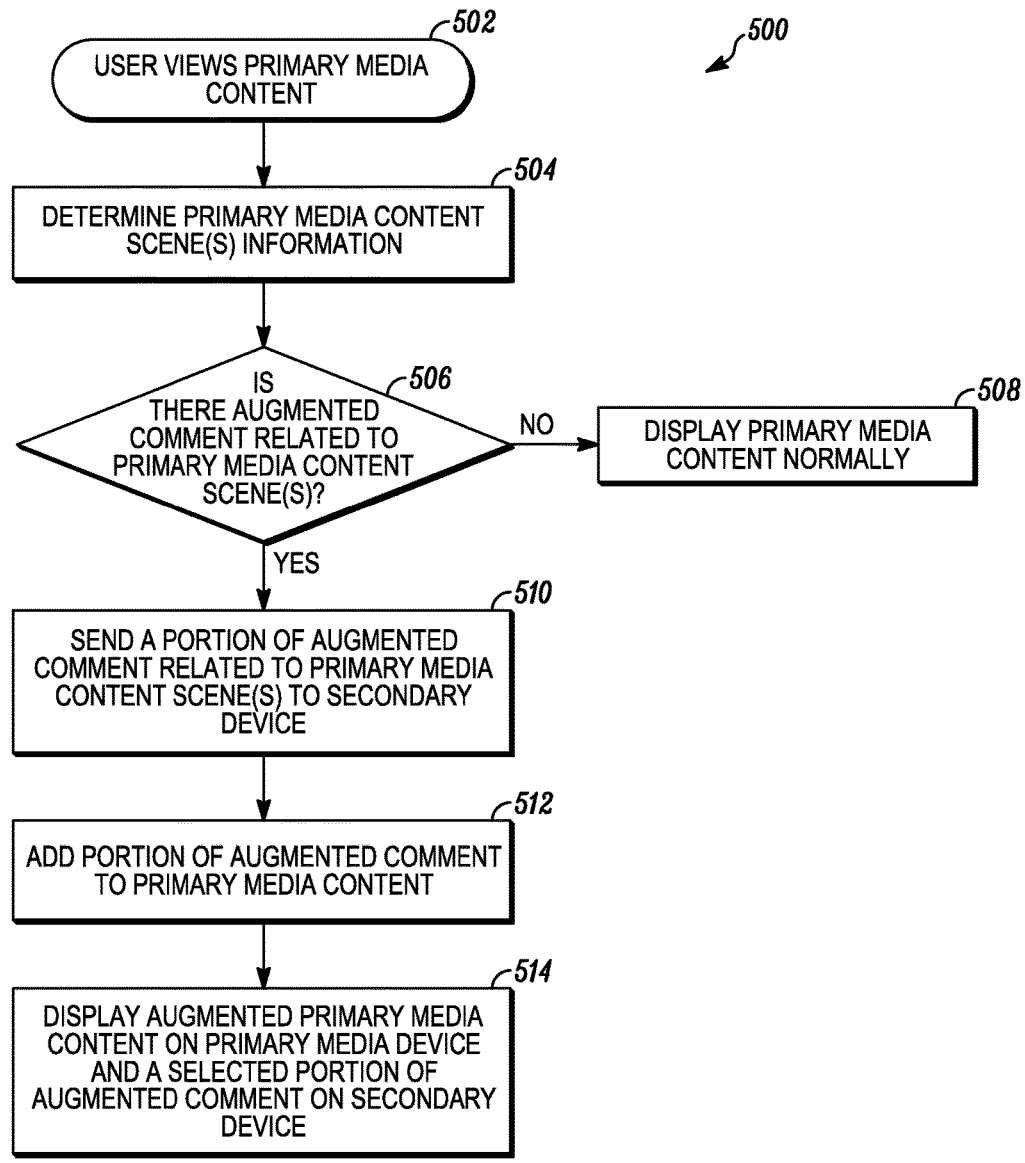
FIG. 5 a flowchart of an exemplary method of utilizing an augmented comment.

Referring now to FIG. 5, an exemplary method of utilizing an augmented comment (augmented user-input information 117) is provided. Referring to FIG. 5, a flowchart 500 shows steps of an exemplary method for utilizing augmented user-input information. More particularly, in step 502, a user views primary media content 101 on a primary media device 102. In step 504, the primary media device 102 or combination device 114 monitors the scenes of the primary media content 101 that are being displayed on the primary media device 102 and the primary-content metadata for one or more scenes. In another embodiment, the secondary device 108 determines the current location of the primary media content 101 and the time within the primary media content 101 that is being viewed and provides that information to the server 112. Then in step 506, the primary media device 102 or combination device 114 queries the server 112 to identify if augmented user-input information 117 exists for one or more of the scenes being displayed or that are expected to be displayed. In another embodiment, the server 112 uses the information to determine if there is augmented user information for the current time period. If no augmented user-input information 117 is available, then in step 508, the primary media content 101 is displayed normally. Although, if augmented user-input information 117 is available, then in step 510, at least a portion of the augmented user-input information 117 is sent to the secondary device 108. In one embodiment, the server 112 may send a portion of the augmented comments that were generated by a user's social group corresponding to the current viewing time period to the secondary device 108. The secondary device 108 may then use the current viewing time and user preferences and context to determine if and when the comments should be displayed. In addition, if there is augmentation information associated with the primary media content 101, then in step 512, at least a portion of the augmented user-input information 117 is added to the primary media content 101 to form augmented primary media content 101, which in at least some embodiments can be stored in the server 112. In one embodiment, the augmentation may be done by sending the information to a combination device 114 to be added to the primary media device 102, to be overlaid on the screen. In other cases, the augmentation may be done by the server 112 sending the augmentation portion to the primary media source 104 directly and enabling the primary media source 104 to send the augmented primary media content 101 to the primary media device 102. In step 514, the augmented primary media content 101 is displayed by the primary media device 102 while at least a portion of the augmented user-input information 117 is displayed on the secondary device 108.

In view of the many possible embodiments to which the principles of the present invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

We claim:

1. A method of augmenting user comments, the method comprising:
    associating a first secondary device with a primary media device, the primary media device for displaying media content, and wherein the first secondary device comprises a secondary display device, a user interface for entering an input, and a client application for providing the user interface;
    receiving, in the first secondary device, a user comment that is provided as the input at the first secondary device by a user of the first secondary device, wherein the input of the user comment is during and responsive to a display of a primary media content on the primary media device for viewing by the user;
    analyzing the user comment to automatically generate user-content metadata comprising one or more of a keyword from the user comment and a key phrase from the user comment;
    at least one of: receiving primary-content metadata related to the primary media content and deriving primary-content metadata from the primary media content,
        wherein the primary-content metadata comprises information identifying a person speaking in the primary media content at a time of the display of the primary media content on the primary media device for viewing by the user, the time associated with the input of the user comment; and further comprises information spoken by the person during or proximate to the time; and
    in one or more devices, using the user-content metadata and the primary-content metadata to automatically generate an identified association between the user comment and the primary-content metadata, the generating comprising analyzing the user-content metadata and the primary-content metadata to identify one or more associations between the user-content metadata and the primary-content metadata,
    wherein the primary-content metadata comprises information relating to a specific viewable object displayed in a scene in the primary media content, and wherein the identified association includes information that relates the user comment to the specific viewable object displayed by the primary media device during the receiving of the user comment by the first secondary device.

2. The method of claim 1 wherein the specific viewable object displayed in a scene in the primary media content is one of: a person, a feature, an article, an item associated with a brand identity, an item associated with model information, an item associated with review information, an item associated with price information, an item associated with specifications information, an item of clothing, an item of food, a room, and a scene location.

3. The method of claim 1 further comprising enhancing viewable primary media content by displaying at least a part of the user comment along with the primary media content.

4. The method of claim 1:
further comprising providing for display to a user of the first secondary device one or more of the identified associations;
wherein the user comment includes at least one of: a text-based and a voice-based user comment.

5. The method of claim 4 wherein deriving primary-content metadata is accomplished by at least one of: a server, the first secondary device, the primary media source, and the primary media device.

6. The method of claim 1 further comprising storing the identified associations for retrieval by a second secondary device separate from the first secondary device to which the user comment was first input.

7. The method of claim 6 further comprising viewing the identified associations on a user interface displayed on the first secondary device.

8. The method of claim 1:
further comprising communicating at least a portion of the primary-content metadata from the first secondary device to a server;
wherein the primary-content metadata are derived from the primary media content provided at least in part by the first secondary device.

9. The method of claim 8 further comprising transmitting primary-content metadata to the first secondary device for association with user-content metadata.

10. A method of operating a first secondary device in a manner that complements operation of a primary media device for displaying media content, the method comprising:
establishing an association of the first secondary device with respect to the primary media device, wherein the first secondary device comprises a secondary display device, a user interface for entering a user comment, and a client application for providing the user interface;
receiving, in the first secondary device, the user comment that is provided to the first secondary device by a user of the first secondary device, wherein the user comment relates to a primary media content that is concurrently output by the primary media device for viewing by the user during the receiving;
analyzing the user comment, wherein the user comment comprises a user comment responsive to the output of the primary media content;
analyzing the primary media content; and
in one or more devices, automatically generating an identified association of the user comment, based at least on a first result from the analyzing of the user comment and a second result from the analyzing of the primary media content, wherein the first result comprises one or more of a keyword from the user comment and a key phrase from the user comment, and the second result comprises information relating to a specific viewable object displayed in a scene in the primary media content, to identify one or more associations between the user comment and the primary media content;
wherein the information relating to the specific viewable object comprises information identifying a person speaking in the primary media content at a time of the concurrent output of the primary media content on the primary media device for viewing by the user, the time associated with the receiving of the user comment; and further comprises information spoken by the person during or proximate to the time; and
wherein the identified association includes information that relates the user comment to the specific viewable object displayed by the primary media device during the receiving of the user comment by the first secondary device.

11. The method of claim 10 wherein analyzing the user comment includes identifying user-content metadata associated with the user comment.

12. The method of claim 11 wherein analyzing the primary media content includes at least one of: analyzing the primary media content to identify primary-content metadata associated with the primary media content and accessing pre-derived primary-content metadata.

13. The method of claim 12 wherein analyzing the user comment includes utilizing an extractor that extracts at least one keyword or key phrase from the user comment to form at least a part of the user-content metadata.

14. The method of claim 13 wherein analyzing the primary media content includes utilizing one or both of a media analyzer and an object detector to identify one or more of: an object, a location, speech, and text, to form at least a part of the primary-content metadata.

15. The method of claim 14 wherein identifying associations between the user comment and the primary media content includes identifying primary-content metadata that are similar to user-content metadata.

16. The method of claim 15 further comprising creating augmented user-input information by augmenting at least a portion of the user comment to include at least a portion of primary-content metadata that are associated therewith.

17. The method of claim 16 further comprising storing the augmented user-input information for retrieval by at least one of the first secondary device and a second secondary device.

18. The method of claim 16 wherein the primary media device is a display device and the first secondary device is a mobile device wherein the user interface is configured to provide viewing of at least a portion of the augmented user-input information.

19. A system for receiving supplemental information related to a primary media content, the system comprising:
a mobile device associated with and distinct from another device, wherein the mobile device comprises a display device, a user interface, and a client application for providing the user interface;
the user interface of the mobile device, configured to receive and display a user comment on the mobile device, wherein the user comment is received from a user responsive to a viewing of the primary media content;
a transmitter inside the mobile device configured to transmit at least a portion of the user comment to the other device that contains the primary media content, the primary media content comprising a scene that was viewable by a user of the mobile device at a time when the user comment was, at least in part, input into the mobile device during the viewing of the primary media content; and
a receiver inside the mobile device configured to receive a communication from the other device, wherein the communication includes an augmented user-input information that comprises the user comment and further includes one or more of: an object list that includes association information that relates the user comment to a specific viewable object displayed in the scene, and object-identification information that includes association information that relates the user comment to a specific physical object viewable in the scene, wherein the augmented user-input information further includes one or more of: primary-content metadata derived from primary media content that are associated with the scene, and user-content metadata derived from the user comment, wherein the primary-content metadata comprises information identifying a person speaking in the primary media content at the time, and further comprises information spoken by the person during or proximate to the time, and wherein the association information is automatically generated based at least on a result from an analysis of the user comment, the result comprising one or more of a keyword from the user comment and a key phrase from the user comment, and further based at least on an analysis of the primary media content.

20. A method of enhancing primary media content, the method comprising:

receiving a user comment on a secondary device associated with and distinct from a primary media device, wherein the secondary device comprises a secondary display device, a user interface for entering the user comment, and a client application for providing the user interface;

obtaining user-content metadata from the user comment, the user-content metadata comprising one or more of a keyword from the user comment and a key phrase from the user comment;

receiving, in the secondary device, primary-content metadata related to a primary media content that was displayed on the primary media device at a time, for viewing by a user of the secondary device during the receiving of the user comment in the secondary device;

wherein the primary-content metadata comprises information identifying a person speaking in the primary media content at the time, and further comprises information spoken by the person during or proximate to the time, and determining whether the user comment is responsive to the display of the primary media content by analyzing the user-content metadata and the primary-content metadata; and in one or more devices, based at least on the determining whether the user comment is responsive to the display of the primary media content, generating an augmented user comment by automatically associating the primary-content metadata and the user comment, wherein the augmented user comment includes automatically generated association information that relates the user comment to a specific viewable physical object displayed in one or more scenes viewable in the primary media content.

21. The method of claim 20 further including enhancing the primary media content by displaying at least a part of the augmented user comment on the primary media device when the augmented user comment is being viewed by the user on the secondary device.

22. The method of claim 21 further including displaying at least a part of the augmented user comment on the secondary device.

* * * * *